(12) United States Patent
Sticherling et al.

(10) Patent No.: US 10,005,428 B2
(45) Date of Patent: Jun. 26, 2018

(54) ASSEMBLY MODULE

(71) Applicant: Huf Hülsbeck & Fürst GmbH & Co. KG, Velbert (DE)

(72) Inventors: Nadine Sticherling, Essen (DE); Helmut Schumacher, Coesfeld (DE); Norbert Heller, Grefrath (DE); Oliver Müller, Velbert (DE); Bernd Ette, Wolfsburg (DE); Mirko Schindler, Velbert (DE); Alexander Ziegler, Wülfrath (DE); Jean Malabo Yomkil, Essen (DE); Stefan Mönig, Schwelm (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days. days.

(21) Appl. No.: 15/115,465

(22) PCT Filed: Jan. 7, 2015

(86) PCT No.: PCT/DE2015/100003
§ 371 (c)(1),
(2) Date: Jul. 29, 2016

(87) PCT Pub. No.: WO2015/113549
PCT Pub. Date: Aug. 6, 2015

(65) Prior Publication Data
US 2017/0166164 A1    Jun. 15, 2017

(30) Foreign Application Priority Data

Jan. 31, 2014 (DE) .................. 10 2014 101 208

(51) Int. Cl.
*B60R 25/24* (2013.01)
*B60Q 1/50* (2006.01)
*B60Q 1/26* (2006.01)

(52) U.S. Cl.
CPC ............ *B60R 25/24* (2013.01); *B60Q 1/2603* (2013.01); *B60Q 1/50* (2013.01)

(58) Field of Classification Search
CPC ........ B60Q 1/2603; B60Q 1/50; B60R 25/24; B60R 25/01; B60R 25/2054; E05F 2015/765
See application file for complete search history.

(56) References Cited

U.S. PATENT DOCUMENTS

2002/0086770 A1* 7/2002 Fischer .............. F16H 61/20
  477/93
2004/0039511 A1* 2/2004 Garnault ............ G07C 9/00023
  701/49

(Continued)

FOREIGN PATENT DOCUMENTS

DE    102005032402 B3    9/2006
DE    102008021989 A1    12/2008
(Continued)

*Primary Examiner* — Mohamed Barakat
(74) *Attorney, Agent, or Firm* — Rudy J. Ng; Bret E. Field; Bozicevic, Field & Francis LLP

(57) ABSTRACT

The invention relates to an assembly module (20) for a motor vehicle (1), said assembly module having an optical sensor system (30) which is suitable a) for monitoring an activation region (22) outside of the motor vehicle (1) during an activation duration in order to identify a user's intention in the activation region (22), b) for providing a working signal in the case that a user's intention has been identified. According to the invention, auxiliary means (31, 43, 45, 80) are provided which help the user (10) to make the user's intention in the activation region (22, 28) known so that the working signal can be provided.

28 Claims, 6 Drawing Sheets

(56) References Cited

U.S. PATENT DOCUMENTS

Figure 1:
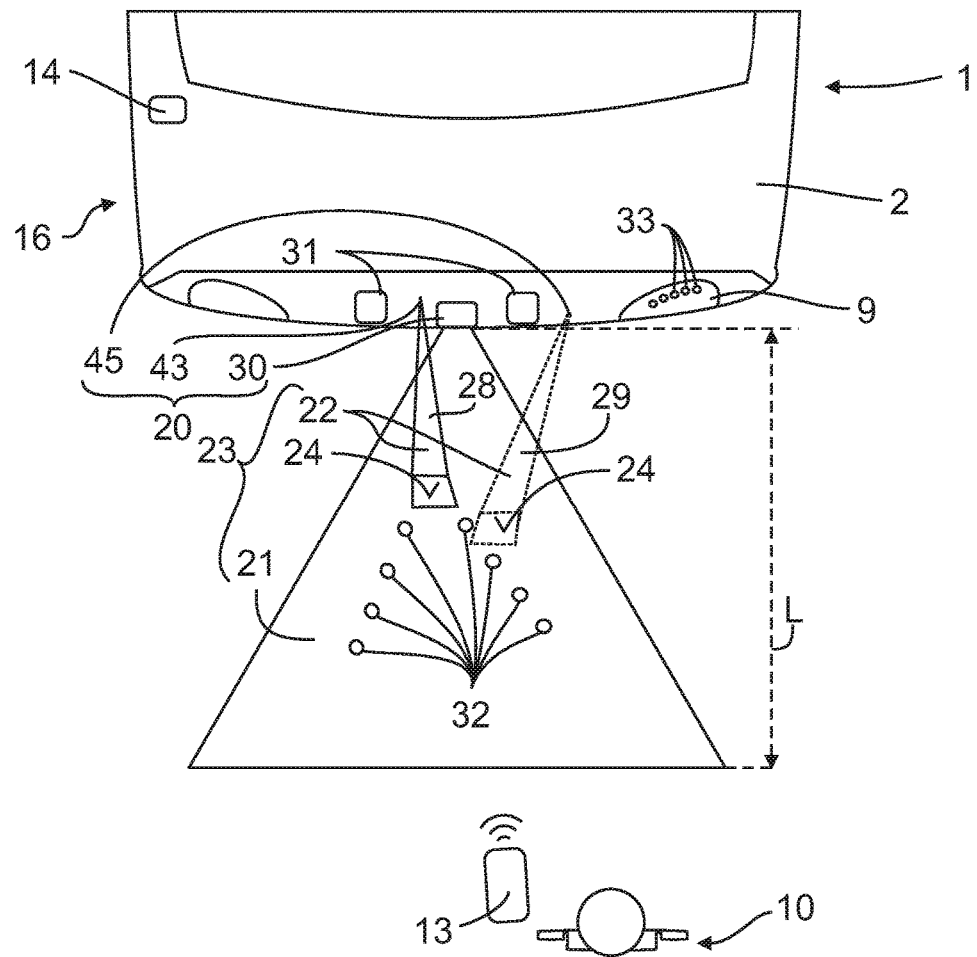

| | | | | |
|---|---|---|---|---|
| 2012/0158253 A1* | 6/2012 | Kroemke | ............ | B60R 25/2054 |
| | | | | 701/49 |
| 2013/0191003 A1* | 7/2013 | Hahne | ................... | B60W 50/14 |
| | | | | 701/99 |
| 2014/0330486 A1* | 11/2014 | Gehin | ................ | B60R 25/2054 |
| | | | | 701/49 |

FOREIGN PATENT DOCUMENTS

| | | |
|---|---|---|
| DE | 102007050094 A1 | 4/2009 |
| DE | 102009023594 A1 | 12/2010 |
| DE | 102010056171 A1 | 6/2012 |
| DE | 102011115760 A1 | 4/2013 |
| WO | WO 2013037806 A1 * 3/2013 ......... B60R 25/2054 |
| WO | WO2013037806 A1 | 3/2013 |

* cited by examiner

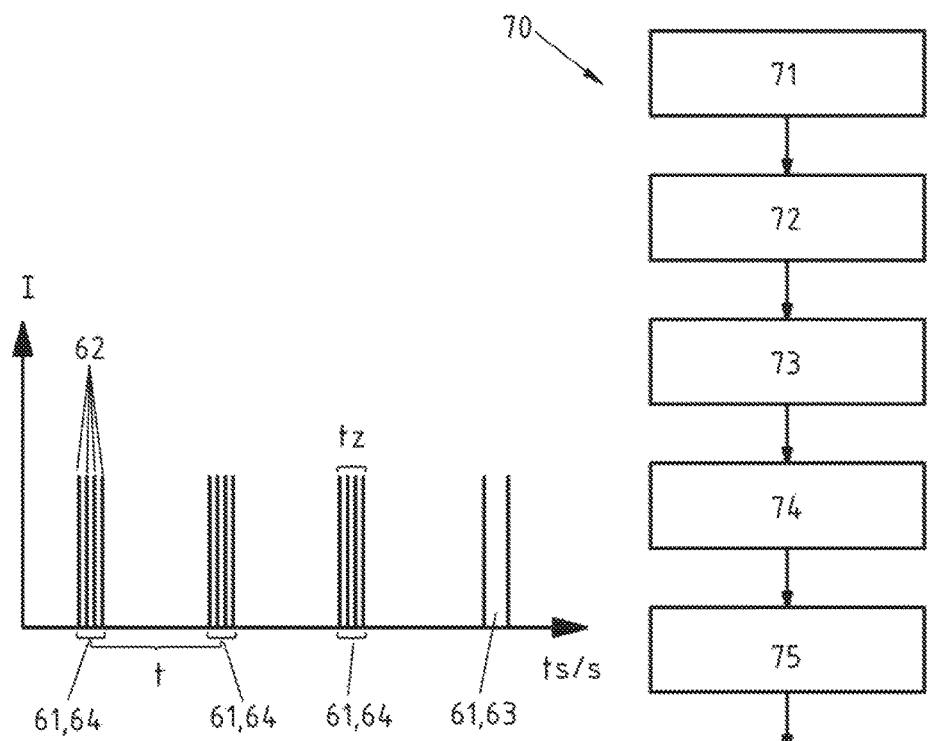
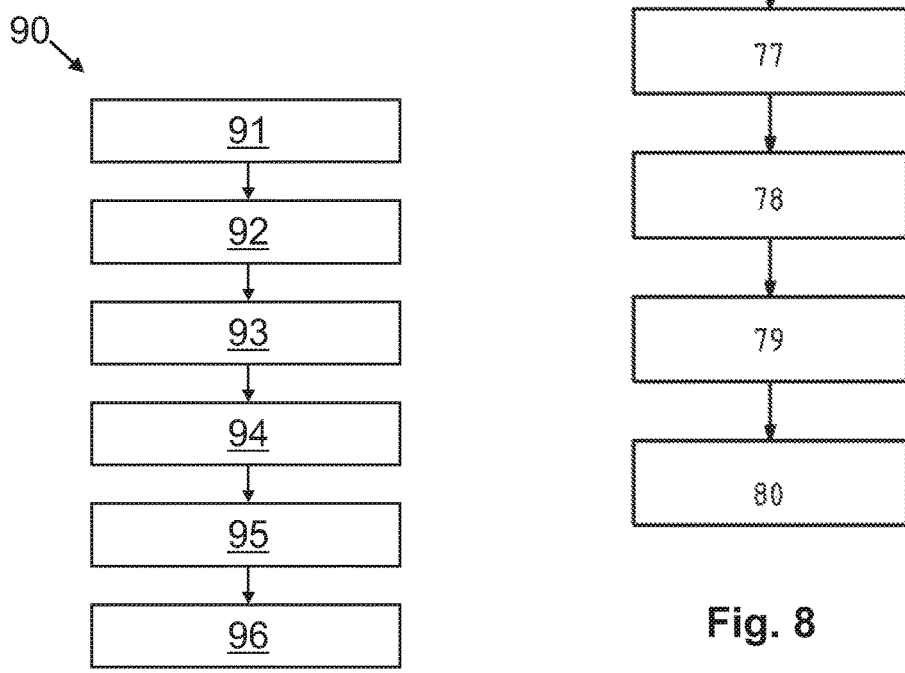
Fig. 7
Fig. 9
Fig. 8

ASSEMBLY MODULE

The invention relates to an assembly module for a motor vehicle comprising an optical sensor system which is suitable
a) for monitoring an activation region outside the motor vehicle during an activation duration in order to identify a user's intention in the activation region),
b) for providing a operating signal in the case that a user's intention has been identified, according to the preamble of patent claim 1.

The invention further relates to an authentication system according to patent claim 22, a motor vehicle according to patent claim 23 or 24 and a method for providing a operating signal for a motor vehicle according to the independent claim 26.

DE 10 2008 021989 A1 discloses a light source which forms a control panel visible to the user. The user can touch the control panel with a foot and thereby initiate an automatic opening of the vehicle door after an unlocking of the vehicle door.

A disadvantage here is that the contacting of the control panel can fail in many different ways. Thus, the control panel can be touched too late, e.g. because the user cannot or can only unsatisfactorily perceive and/or reach the control panel. Thus, in such a case the vehicle door cannot be opened automatically.

It is therefore the object of the present invention to provide an assembly module and a method for a motor vehicle and a motor vehicle which overcomes at least one of the aforesaid disadvantages, in particular more reliably provides the operating signal when a user's intention is present.

In order to solve the object, an assembly module having all the features of claim 1 is proposed. Advantageous further developments of the assembly module are specified in the dependent device claims. The object is further solved by a motor vehicle according to the independent claim 23 and a method according to the independent claim 26. An advantageous further development of the method is specified in the dependent process claim. Furthermore an authentication system comprising an assembly module according to the invention, an ID transmitter and an access control system is protected in claim 22. Likewise a motor vehicle having an assembly module according to the invention and/or an authentication system according to the invention is protected according to claim 24. Further features and details which are described in connection with the assembly module according to the invention and/or authentication system and/or motor vehicle also apply in connection with the method according to the invention and conversely. The features mentioned in the claims and in the description can in each case be essential to the invention individually or in combination.

According to the invention, in particular an auxiliary means is provided, which helps the user to make the user's intention in the activation region known so that the operating signal is provided.

Here it is essential to the invention that the assembly module according to the invention is not only restricted to a specific visible control panel which is only made visible in a single manner and is monitored for only a specific maximum activation time. On the contrary, auxiliary means are provided in particular in the assembly module. The auxiliary means can in particular increase the possibilities for making known the user's intention in the activation region and/or improve or vary the manner of making visible the activation region. As a result, the assembly module according to the invention is configured to be particularly user-friendly. The opportunities for the user to make known his intention are therefore increased so that the operating signal can be provided more reliably. In particular, an auxiliary means can be understood in this case to be an additional element in the assembly module which helps the user to make known his intention in the activation region, a specific additional state of an element of the assembly module and/or an additional process step stored in the assembly module. The additional process step can in particular be designed with the aid of the assembly module. Preferably the auxiliary means configured as a method can be stored in a monitoring unit of the optical sensor system.

The operating signal may be a signal for unlocking and/or locking and/or opening and/or closing a movable part of the motor vehicle. The movable part can in particular comprise a tailgate and/or a side door of the motor vehicle. The tailgate and/or the side door can be configured as a sliding door. The movable part can, for example, be unlocked by the operating signal. As a result of the spring effect of a seal, the movable part can then move partially from a closed position and thus partially open. Additionally or alternatively the operating signal can be a signal for activating a motor-driven opening and/or closing aid. In this case the motor vehicle has a motor which completely opens and/or closes the moving part.

Alternatively or additionally the operating signal may be a signal for retracting and/or extending a trailer coupling. In particular when monitoring the activation region, a plurality of different user's intentions can be determined such as, for example, the user's intention to open a movable door and the user's intention to extend the trailer coupling.

A user's intention is understood as a user's intention to provide a operating signal. For the user's intention it can be sufficient if a body part of the user is present during the activation duration in the activation region. Preferably however, a further specification is required to identify the user's intention. Thus, in step a) the user's intention can be identified by a predefined movement. The predefined movement can comprise a movement of a body part of the user in or on the activation region. The body part can in particular comprise a hand or a foot. The predefined movement can additionally or alternatively comprise the movement of the body part of the user into the activation region or out from the activation region. It can also be the case that the predefined movement corresponds to a predefined gesture. Furthermore it can be the case that the user's intention is only identified when a predefined minimum distance of the body part from the optical sensor system, in particular from an optical sensor of the optical sensor system is adhered to as a specification. It can be the case that as a specification the body part must have a certain size or must stay in the activation region for a certain duration. If various user's intentions are determined when monitoring the activation region, different specifications can be assigned to different user's intentions. Thus, for example, a treading with the foot in the activation region can cause an opening of the tailgate whereas a lateral movement of a hand near the optical sensor brings about an extension of the trailer coupling.

It is feasible that as a specification a removal of the body part from the activation region must take place within a predefined removal duration so that the operating signal is provided. The removal duration lies within the activation duration. The removal of the body part within the predefined removal duration can be a part of the predefined movement.

It is feasible that the activation region ends on a ground surface on which the motor vehicle is standing. The activation region has an end surface at the ground surface. In this case, the activation region can run substantially orthogonally to the ground surface or run at an angle of inclination to a plane which runs parallel to a plane connecting the vehicle axes. This angle of inclination in particular corresponds to the angle of inclination of the optical sensor.

In particular, the activation region comprises a frustro-conical region with a round or elliptical base surface. The frustro-conical region can in particular correspond to an oblique truncated cone.

The activation duration is in particular the time interval in which the activation region is monitored in order to identify a user's intention to provide the operating signal. The activation duration ends in particular with the identification of the user's intention or with the elapse of a predefined time interval without the user's intention having been identified. The predefined time interval in which the user's intention can be identified at most is designated as maximum activation duration. Outside the activation duration a user's intention for preparation of the operating signal is not identified and thus the operating signal is not provided.

Preferably the assembly module comprises a display element through which visible light can be emitted in order to make at least a part of the activation region and/or the activation duration visible for the user. In particular an end surface of the activation region lying on the ground surface can be made visible. In order to make the activation duration visible for the user, it is feasible that the display element is switched on at the beginning of the actuation duration. When the activation duration ends, the display element can be switched off. The visible light can be emitted variably by the display element. Thus, the light emission of the display element can be adapted, e.g. to a changed activation region and/or a changed maximum activation duration. In addition, in the case of an unchanged activation region and in the case of an unchanged maximum activation duration, visible light which can be emitted variably can serve as auxiliary means for the user.

For example, the display element may be brought into a plurality of illumination states. The illumination states differ in the manner in which the visible light is emitted. Thus, in one of the illumination states the display element can emit the visible light with a constant brightness. In another illumination state the display element can emit light with a periodically varying brightness. By this means a flashing of the display element can be achieved. The different illumination states of the display element can transmit a message to the user and thus serve as auxiliary means. For example, one illumination state can serve as an information signal for the end of the activation duration, in particular the maximum activation duration. For this purpose it can be provided that in a predefined time interval before the end of the maximum activation duration the display element changes into the illumination state in which it acts as auxiliary signal. For example, the display element can begin to flash. Through the information signal the user receives the information that the activation duration is nearing the end and the user must hurry to make known his user's intention in the activation region.

The beginning of the removal duration can be perceptible for the user, thus for example the display element can change to a different illumination state at the beginning of the removal duration.

It is also feasible that the position and/or the size of the activation region and/or the maximum activation duration is variable. This variation is particularly helpful when a physically impaired user would like to make known his user's intention. Thus, a physically impaired user can, for example, not reach the activation region sufficiently quickly during the originally provided maximum activation duration. It is also feasible that the physically impaired user does not spatially reach the original position of the activation region. A variable position and/or size of the activation region can however also be helpful for a physically unimpaired user. Thus, for example, the activation region can be located at an unfavourable position. The unfavourable position can be permanent in this case, for example, the activation region can end at a trailer coupling. Alternatively the unfavourable position can be unfavourable only once for the provision of the operating signal, e.g. because the activation region ends in a puddle. Since the position of the activation region, the size of the activation region and/or the length of the maximum activation duration is variable, it is easier for the user to make known his user's intention to provide a operating signal in the activation region. Thus, a variable activation region and/or a variable maximum activation duration act as auxiliary means. The varied activation region and/or the varied maximum activation duration is in particular stored in the monitoring unit of the assembly module.

In particular, the position and/or the size of the activation region and/or the length of the maximum activation duration can be varied by a predefined user action. The assembly module in particular varies the position and/or the size of the activation region and/or the maximum length of the activation duration after the assembly module has received a signal about the predefined user action or after the assembly module has identified the predefined user action.

Advantageously the assembly module is suitable for renewed monitoring of the activation region in order to identify a user's intention to provide a operating signal when a preceding maximum activation duration has elapsed without an identification of a user's intention. This is particularly helpful when the user is distracted and has not reached the activation region in good time or has not succeeded in making known the user's intention in the activation region because he has not fulfilled a specification, e.g. has not made the predefined movement. It can thus be provided that the activation region can be monitored several times, in particular two or three times in succession, to identify a user's intention. The renewed monitoring of the activation region can be initiated automatically. Alternatively a predefined user action can be necessary to monitor the activation region again for another activation duration. The renewed monitoring can be initiated by a predefined user action. The assembly module in particular initiates the renewed monitoring after the assembly module has a received a signal about the predefined user action or after the assembly module has identified a predefined user action. Optionally after the end of the preceding maximum activation duration and before the renewed monitoring of the activation region, an authentication check of the user is made.

Various predefined user actions are feasible. The predefined user action can correspond to an input into a user menu. The predefined user action can be configured in such a manner that the user changes the position of the activation region, the size of the activation region and/or the maximum length of the maximum activation duration by an input into a user menu. The user menu can be the user menu of the assembly module, a motor vehicle controller or an ID transmitter. In the last two cases the input is transmitted to the assembly module. A predefined user action as input into a user menu is in particular feasible when the position and/or the size of the activation region and/or the maximum length of the activation duration are to be changed permanently, e.g. for a physically impaired user, or because the activation region occupies a permanently unfavourable position. Alternatively the predefined user action can be a predefined user action identifiable by the optical sensor system. In this case the predefined user action can, for example be a predefined gesture which must be executed within a perception range of the optical sensor system. In this case, it can for example be a to-and-fro movement of a body part of a user. It can be necessary for a body part to remain in the perception range, in particular in the activation region, for the predefined gesture. The body part can in particular comprise the hand or the foot of the user. Alternatively and/or additionally the predefined user action which can be identified by the optical sensor system can be a movement of the user into the perception range of the optical sensor system and/or out of the perception range of the optical sensor system. In particular, it can be provided that the user leaves the perception range for a predefined time interval and then enters into the perception range again.

It may be provided that the perception range of the optical sensor is divided into a detection region and an activation region. In this case, the detection region and the activation region can overlap. Preferably the activation region is formed in the detection region, wherein in particular the detection region corresponds to the perception range. Alternatively no detection region can be provided, where in particular the activation region corresponds to the perception range. It can be provided that the gesture provided as the predefined user action must be executed in the activation region or the detection region. Likewise as a predefined user action, the user can leave either the detection region or the activation region for a predefined time interval and then return into the corresponding region again. In order to identify the predefined user action, the optical sensor system outside the activation duration can check the perception range, the detection region and/or the activation region.

As a result of the predefined user action identifiable by the optical sensor system, the position of the activation region and/or the length of the maximum activation duration can be changed permanently. Permanently means here that the change is stored as a predefined setting. Alternatively it is possible that as a result of the predefined user action which is identifiable by the optical sensor system, only the position of the activation region and/or the maximum length of the activation duration is changed for the current provision of the operating signal. In this case, it is also feasible that different predefined user actions cause different changes. Thus, for example, as a result of a predefined user action the position of the activation region can be shifted once. On the other hand, as a result of a different predefined user action the length of the maximum activation duration is changed permanently.

Another type of predefined user action may be the triggering of a capacitive sensor. This predefined user action can be used in particular for the renewed monitoring of the activation region. Here it is in particular sufficient if a body part only comes into the vicinity of the capacitive sensor. That is, a slight change in the capacitance can be sufficient to cause the activation region to be monitored again. The capacitive sensor can be a capacitive sensor of the assembly module or a capacitive sensor already present in the motor vehicle which transmits a signal to the assembly module.

In an alternative, the assembly module may be transferred into a learning mode. In the learning mode the assembly module can, for example learn the length to be changed of the maximum activation duration. In the assembly module the physically impaired user, e.g. a wheelchair user, a wheeled walking frame user or a person who uses a walking stick can predefine his movement sequence and the assembly module learns how long the physically impaired user requires for making known his activation intention. Accordingly the assembly module can learn a modified movement sequence in the learning mode. Thus, for example, the wheelchair user can teach the assembly module a different minimum distance condition in the learning mode and/or teach the assembly module a different predefined movement in the learning mode. For example, the minimum distance condition can be reduced. It is also feasible that in the learning mode the assembly module learns the position to be changed and/or the size of the activation region.

It can be provided that the variable positions of the activation region are individually adjustable. In particular, the positions which the activation region can adopt can be learnt in the learning mode. Alternatively it can be provided that different positions which the activation region can adopt are fixedly predefined in the optical sensor system.

Thus, different positions of the activation region may be fixedly predefined. If the assembly module determines that a position of the activation region is undesired, it changes to another fixedly defined position of the activation region. In particular, the sequence in which the activation region changes the position is fixedly predefined. That is, if a first position of the activation region is not possible, the activation region changes to the second position etc.

In order that the various positions of the activation region can be made visible for the user, the display element can have a plurality of lighting elements. In each case one or a plurality of lighting elements are fixedly assigned to the different positions of the activation region. That is, if a first position of the activation region is monitored, the first position is illuminated by the appurtenant lighting element. If the activation region changes into the second position and is monitored in the second position, this position is illuminated by another corresponding lighting element of the display element. The other lighting elements are switched off. A change in the position of the activation region and the associated change in the lighting element to be switched on are possible if an lighting element is defective. In this case, a position of the activation region is selected with an intact appurtenant lighting element.

Another auxiliary means which helps the user to make known the user's intention in the activation region in order to provide the operating signal can lie in the user being guided to the activation region. This is particularly helpful if the user cannot perceive the activation region, in particular the end surface of the activation region on the ground surface as a result of carrying a large item, e.g. a package. The assembly module can be suitable for determining the position of the user and the direction in which the user has to move towards the activation region. In particular, the position of the user in the perception range can be determined in this case. The assembly module, in particular the monitoring unit, is suitable for triggering a discernible signal for the user to lead the user to the activation region. The discernible signal can be a visible, audible or perceptible signal.

The assembly module may itself comprise the means by means of which the discernible signal can be generated for the user in order to lead the user to the activation region. Alternatively the motor vehicle has the means by means of which the discernible, in particular visible, audible or perceptible signal can be generated for the user in order to lead the user to the activation region. For example, the assembly module can have additional lighting elements and/or a loudspeaker. Alternatively means already provided in the motor vehicle can be used, e.g. lights arranged adjacently in the motor vehicle, in particular lights of a tail lamp, lights of a brake lamp or lights of the indicators, and/or a loudspeaker. The motor vehicle can provide this means for generating the perceptible signal. In particular, the signal is configured so that the user is guided in the direction of the activation region. Thus, lighting elements or lights can be switched on in a sequence which shows the user in which direction the user must move towards the activation regions. If for example the lighting elements or the lights light up from left to right, the user must turn to the right. It is also feasible to give the user an instruction acoustically in which direction the user must move. For this purpose the corresponding loudspeaker can be used. It is also feasible to notify the direction change to the ID transmitter which shows the user the way by various vibrations.

In another alternative all the lighting elements light up permanently during the activation duration. The lighting elements can be arranged here so that the lighting elements act as way markers. For example, the lighting elements can be aligned in such a manner that markings are produced on the ground surface which lead towards the activation region. The markings can be configured as light points formed by the visible light emitted by the lighting elements.

As a further auxiliary means, the assembly module can be configured in such a manner that the light emitted by the display element depends on the brightness of the ambient light. In particular, the brightness of the ambient light can be determined by a brightness sensor. The brightness sensor can, for example, already be present in the motor vehicle. The brightness of the ambient light is transmitted to the optical sensor system, in particular the monitoring unit, which then determines the intensity of the light emitted by the display element. Alternatively the assembly module itself has the brightness sensor. As a result of the auxiliary means it can be ensured that the activation region is always displayed sufficiently brightly to the user so that the user is helped to make known his user's intention.

The monitoring unit of the optical sensor system controls and/or regulates the method by means of which the user's intention is identified in the activation region within the activation duration. Thus, the monitoring unit is used to evaluate the optical sensor. The monitoring unit can be configured to evaluate images which have been recorded by the optical sensor. The monitoring unit can identify by means of the predefined specifications the user's intention in the activation region. For this purpose the monitoring unit evaluates the images received by the optical sensor according to the predefined specifications. The monitoring unit can provide the operating signal in step b). The monitoring unit in particular uses the auxiliary means. Thus, the monitoring unit can instigate the transfer of the display element into the various operating states and/or adjust the brightness of the emitted light. The monitoring unit can identify the predefined user action which can be identified by the optical sensor system. The monitoring unit can instigate the renewed monitoring of the activation region. The monitoring unit can change the position and the size of the activation region and change the maximum activation duration. The monitoring unit can comprise a processor and a storage device with the aid of which the procedure according to the invention can be executed.

The optical sensor system may comprise the optical sensor.

The optical sensor may be configured in order to receive light from the perception range. The optical sensor records images of the perception range. For this purpose the optical sensor can comprise a lens system. Each image can in particular be composed of a total number of pixels. The optical sensor can comprise an image sensor which has the total number of pixels. The image sensor can be a CMOS sensor and/or an LDPD sensor. The LDPD sensor (lateral drift field photodetector) is described in the document DE 10 2009 020 218 B3. The LDPD sensor is suitable for being evaluated particularly rapidly.

The optical sensor system may comprise a light module for emitting light. The light is used to form the perception range. To this end the light module can have a lens system. It can be provided that the perception range is invisible for the user. To this end the light module emits light in the non-visible range. In particular the light can comprise infrared radiation, in particular near infrared radiation. The light module can comprise only one light source. Alternatively the light module can comprise a plurality of light sources. The light sources can be arranged around the optical sensor. Thus, for example, light sources can be arranged on the left and right of the optical sensor. Alternatively the light sources can be arranged around the circumference of the optical sensor. The light can comprise laser light.

The perception range is the region in which the optical sensor can receive light of the light module. In particular, the perception range can be formed by the superposition of a transmitting region of the light module and a receiving region of the optical sensor. Preferably the perception range is formed by the total superposition of the transmitting region with the receiving region. The transmitting region of the light module is obtained from the region in which the light module emits light of sufficient intensity. The receiving region is obtained from the region from which the optical sensor can receive light. The transmitting region of the light module can be composed of the transmitting regions of the individual light sources.

It may be provided that the optical sensor comprises an infrared filter and/or a polarization filter. By this means at least some of the interfering light can be filtered out. Interfering light can, for example, comprise sunlight or light from an artificial light source, e.g. garage light. Likewise the light module can have a polarization filter.

It may be the case that the optical sensor system is configured to record identification images and comparative images and optionally evaluate them. Identification images are formed with the aid of the reflection of the emitted light of the light module. Comparative images are only formed with the aid of interfering light. In order to form comparative images the light module emits no light. The monitoring unit can identify interfering light by comparing an identification image and a comparative image. The monitoring unit can as a result generate a modified identification image from which the interfering light is removed. The optical sensor system may be configured so that in each case after a predefined number of identification images, a comparative image is recorded.

The assembly module may have a fastening element, in particular an installation plate, in order to fasten individual elements of the optical sensor system, i.e. the optical sensor, the light module, the display element and/or the monitoring unit. Alternatively or additionally the assembly module can comprise a housing which at least partially surrounds the optical sensor system. The monitoring unit can be formed together with the access control system.

It is possible that the image sensor has pixels. During the monitoring of the activation region the optical sensor system in particular evaluates only that part of the pixels which image the activation region. If the activation region can adopt several positions, different pixels are evaluated according to the position of the activation region.

It may be provided that the optical sensor system or the entire assembly module is configured for arrangement on the vehicle rear, e.g. behind the rear window, in a handle strip, in an emblem, in a tail lamp, behind a reflector, on a bumper and/or in a gap between two components. Alternatively or additionally, the assembly module can be suitable for being fastened on a vehicle side, e.g. in a B pillar. In particular, the optical sensor system or the entire assembly module is concealed behind a layer which is opaque from the outside, which however is transparent to the light of the optical sensor system. Thus, for example, the bumper on which the optical sensor system is mounted can be varnished.

Preferably the optical sensor system is arranged on the motor vehicle in such a manner that it does not get very dirty. For example, the optical sensor system can be arranged behind the rear window in the wiping area of the windscreen wiper or on the handle strip. Alternatively or additionally the assembly module can have a wash nozzle which can clean the optical sensor system. The wash nozzle can thereby automatically clean the optical sensor system whenever the windscreen wiper of the front and/or rear window is actuated.

In order to be able to identify the user's intention, in particular in order to be able to identify a predefined minimum distance condition or a predefined movement, the distance of the body part from the optical sensor can be detected. For this purpose, for example a time of flight measurement can be made. In this case, for example, one or several light pulses are emitted by the optical sensor system, in particular from the light module of the optical sensor system and the time taken by the light pulse to the object and from there to the optical sensor is measured. The time is here directly proportional to the distance of the object. It can be that several light pulses are emitted successively by the optical sensor system, in particular by the light module in order to produce an image. The light pulses can be integrated or summed to produce the image. In order to be able to make a distance detection in this case, a certain time interval is predefined for the image recording in the optical sensor system. The total intensity of the light pulses received in the optical sensor in the time interval is correlated with the distance.

The activation region is in particular monitored after an authorized user has been authenticated. The optical sensor system can thus be suitable before step a) of receiving a signal that the authorized user is authenticated and then instigating the monitoring of the activation region. In the authentication the access authorisation of a user is checked.

In addition, the optical sensor system can be suitable for monitoring prior to authentication a detection region lying outside the motor vehicle and in the case of identifying the user in the detection region triggering a signal for starting an authentication check between an ID transmitter and an access control system of the motor vehicle. That is, the detection region serves to determine the proximity of a user. If the proximity of a user in the detection region is determined, in particular a passive keyless entry check can be initiated.

The optical sensor and/or the light module may be configured to be used both for monitoring the detection region and also for monitoring the activation region. That is, the same optical sensor and/or the same light module are used for monitoring the detection and the activation region. For this purpose the optical sensor and/or the light module comprise a rigid lens system. In particular, for monitoring the detection range the light module can emit the same light in relation to the wavelength and/or the duration of a light pulse as for monitoring the activation region. Alternatively a monitoring of the detection region and/or the activation region can initially be accomplished with light of a longer wavelength than the subsequent checking of specifications or requirements which are made on the identification of a user and/or user's intention. Thus, initially for example light having a wavelength of 905 nm can be used. Then, for example light having a wavelength of 800 nm can be used.

The assembly module may be configured so that in a plan view, the detection region ends at a greater distance from the motor vehicle than the activation region. It is thereby ensured that after a positive authentication, the activation region is located between the user and the motor vehicle. That is, the user can usually maintain his direction of movement in order to reach the activation region. In a plan view the activation region can be located within the detection region. In particular, each position which can be adopted for the activation region lies inside the detection region. Alternatively it can be provided that in a plan view the activation region is located closer to the motor vehicle than the detection region. In particular the activation region can adjoin the detection region.

It may be the case that a position of the ID transmitter is checked during or after the authentication and before triggering of the operating signal. To this end, the intensity of a signal emitted by an ID transmitter can be used. For example, the receive signal strength indicator (RSSI) can be used for this. By determining the intensity of the emitted signal, it can be determined, for example, whether the user is located in front of, next to or behind the motor vehicle. By this means it can be ensured that only the authorized user himself enters into the detection region and has made known his user's intention in the activation region. It is feasible to interrogate the RSSI cyclically.

The invention also comprises an authentication system comprising an ID transmitter, an access control system and an assembly module according to the invention. In this case, the assembly module can be configured as described and/or claimed. The authentication system is suitable for performing an authentication check for an access authorization. In particular, after the assembly module has triggered the signal for the triggered the signal for the authentication check, the authentication check can be continued. In the authentication check the access control system can send a wake-up signal to the ID transmitter. The ID transmitter can then send an authentication code to the access control system. The access control system can compare the received authentication code with a stored code. In particular, in the case of an agreement, i.e. in the case of a successful authentication, a signal can be triggered. This can be an unlock signal. Alternatively it is a signal for starting the monitoring of the activation region. In this case, the unlocking signal is only triggered when at least one further signal, in particular the operating signal and/or a further authentication, is made. In another alternative the operating signal also comprises the unlocking signal. The authentication system can also be suitable for determining a minimum distance and/or the position of the user from the motor vehicle and/or for guiding the user to the activation region.

The object of the invention is also solved by a motor vehicle having an assembly module which comprises an optical sensor system which is suitable for
a) monitoring an activation region lying outside the motor vehicle during an activation duration in order to identify a user's intention in the activation region,
b) in the case of identifying a user's intention, providing a operating signal.

The motor vehicle may have an auxiliary means which helps the user to make the user's intention in the activation region known so that the operating signal is provided. In particular, the motor vehicle can have means by means of which a discernible, in particular visible, audible or perceptible signal can be produced for the user, in order to lead the user to the activation region.

The motor vehicle may have an assembly module as described and/or claimed.

The object of the invention is also solved by a method for providing a operating signal for a motor vehicle comprising the following steps:
a) monitoring an activation region lying outside the motor vehicle during an activation duration in order to identify a user's intention in the activation region,
b) in the case of identifying a user's intention, providing a operating signal.

In this case, the method can provide an auxiliary means which helps the user to make the user's intention in the activation region known so that the operating signal is triggered.

The method may include further process steps which are disclosed in connection with the assembly module, the authentication system and/or the motor vehicle.

Figure 2:
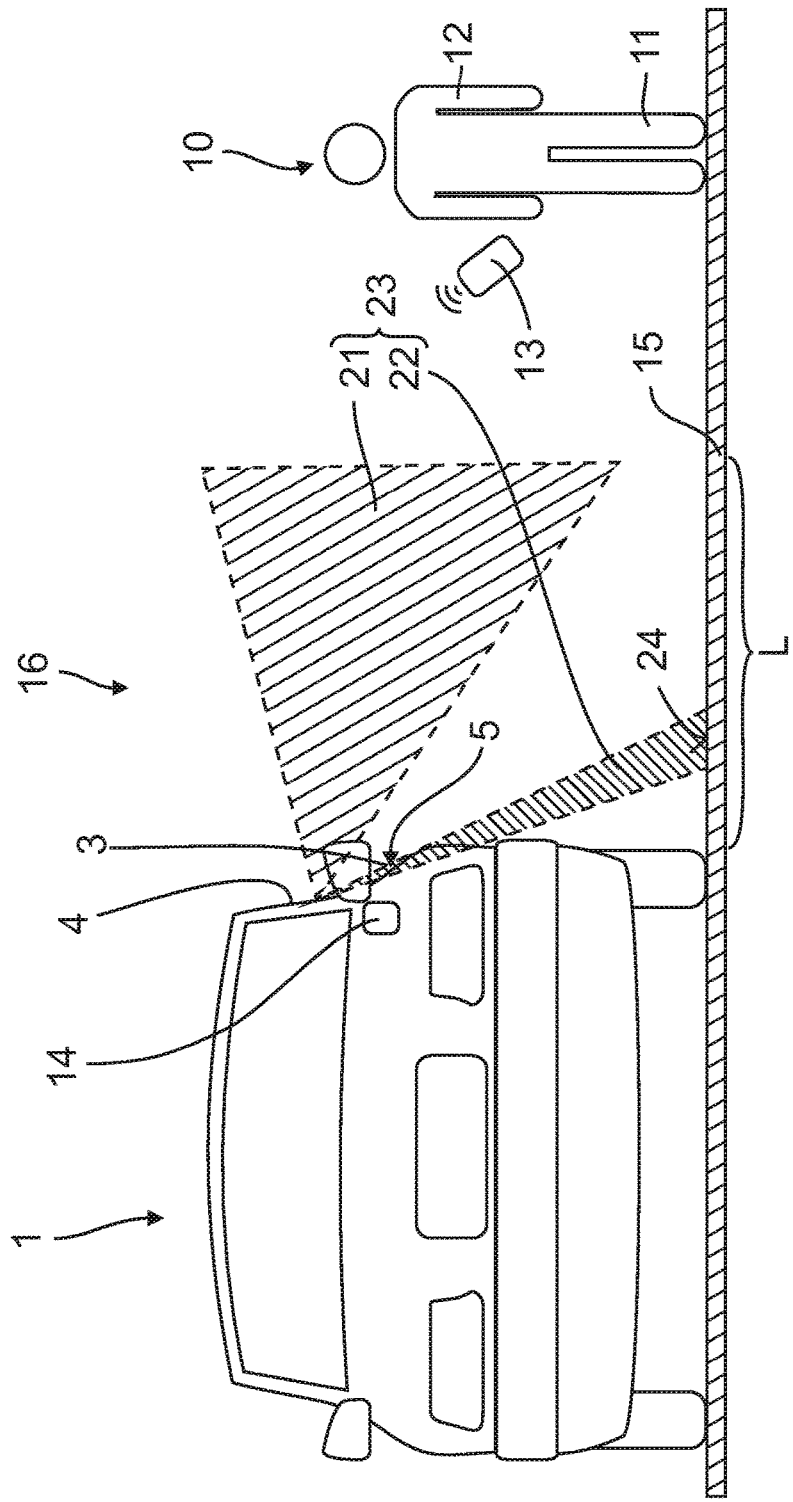
Figure 3:
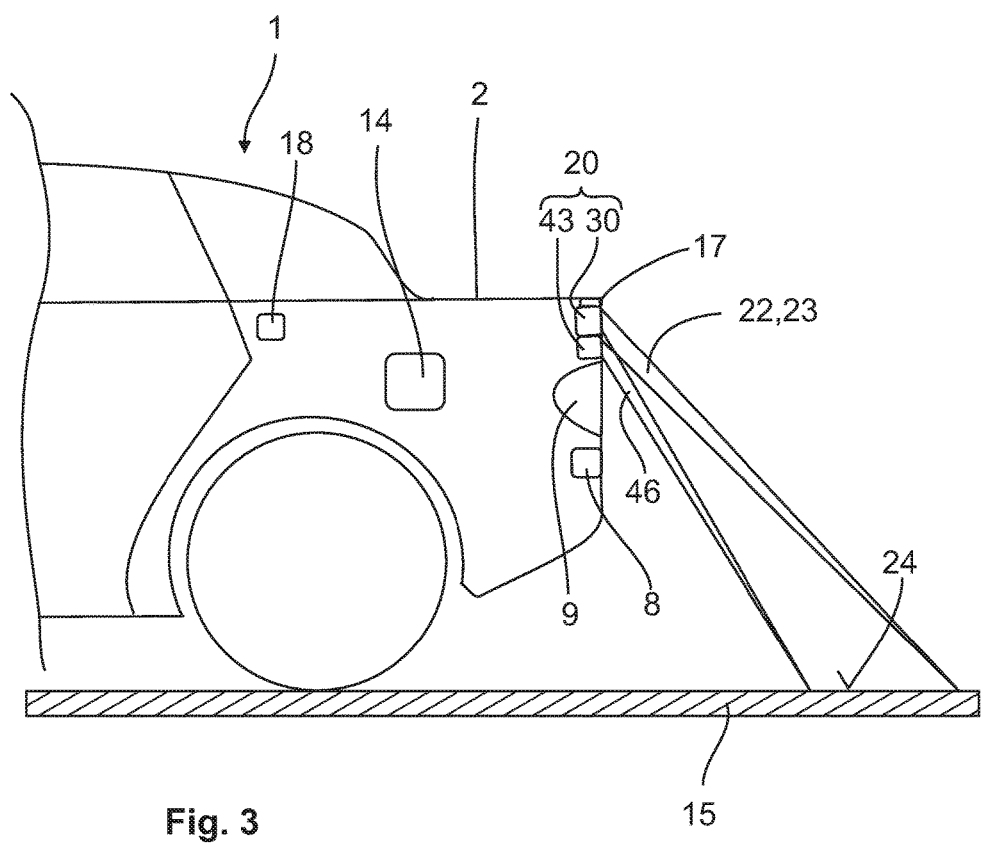
Figure 4:
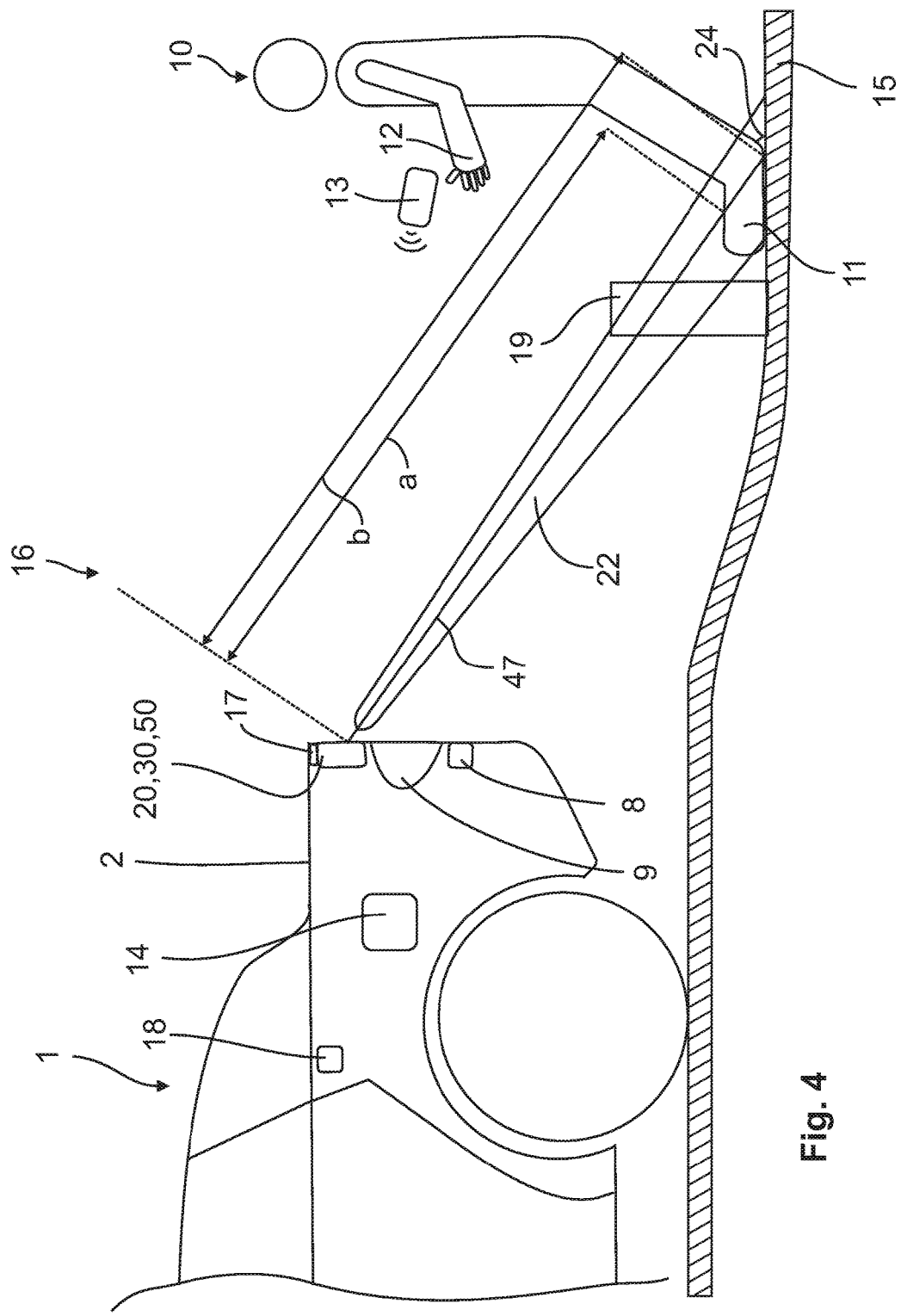
Figure 5:
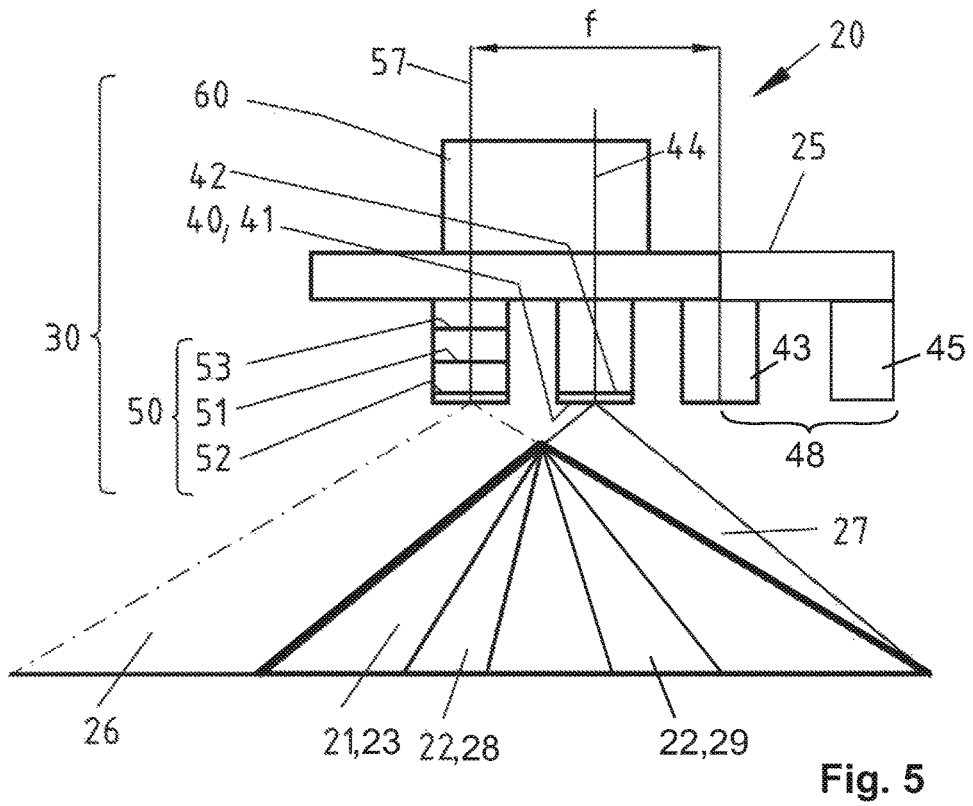
Figure 6:
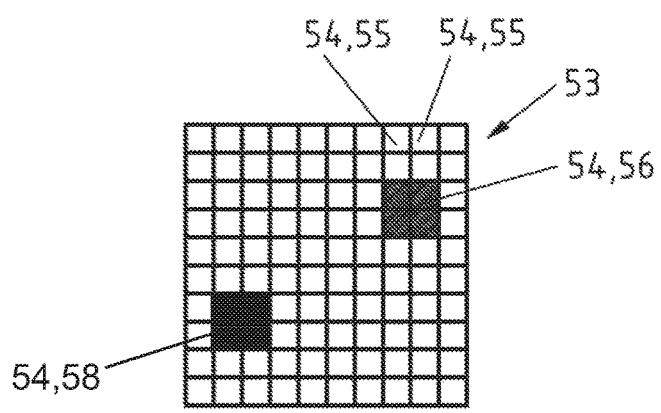

Further measures which improve the invention are obtained from the following description for the exemplary embodiments of the invention which are shown schematically in the figures. All features or advantages predefined from the claims, the description or drawings including constructive details, spatial arrangement and process steps can be essential to the invention both for themselves and also in most diverse combinations. In the figures:

FIG. 1 shows a plan view of a rear region of a motor vehicle according to the invention with an assembly module according to the invention and an authentication system according to the invention, FIG. 2 shows a side region of another motor vehicle according to the invention with another assembly module according to the invention and another authentication system according to the invention in a side view, FIG. 3 shows a side view of a rear region of another motor vehicle according to the invention with another assembly module according to the invention and another authentication system according to the invention in a side view, FIG. 4 shows a side view of a rear region according to FIG. 3, FIG. 5 shows a plan view of an assembly module according to the invention, FIG. 6 shows a view of an image sensor from FIG. 5 where it is shown how a monitoring unit of an assembly module according to the invention can evaluate the image sensor, FIG. 7 shows a diagram of the radiation intensity over time, which is emitted by an assembly module according to the invention, FIG. 8 shows a method according to the invention and FIG. 9 shows another method according to the invention.

Elements having the same function and mode of action are designated with the same reference numbers in the figures.

FIGS. 1 to 4 each show how an assembly module 20 according to the invention and an authentication system 16 according to the invention are used in a motor vehicle 1 according to the invention. FIGS. 1, 3 and 4 here show the use in a rear region of a motor vehicle 1 with a tailgate 2. The optical sensor system 30 of the assembly module 20 is disposed in the region of the tailgate 2, e.g. in a handle strip of the tailgate 2.

In FIG. 1 an activation region 22 lying outside the motor vehicle 1 is produced in a first position 28 by the optical sensor system 30. The activation region 22 is directed towards a ground surface 15 shown in FIGS. 2 to 4 and has an end surface 24 on the ground surface 15. After a successful authentication, the optical sensor system 30 monitors the activation region 22 in the first position 28. If the user 10 makes known his user's intention whereby the user 10 executes a predefined movement in the activation region 22 in the first position 28, and for example, treads into the activation region 22 in the first position 28 with a foot 11 for a certain time and within a predefined maximum activation duration, the optical sensor system 30 identifies the user's intention and provides a operating signal. The operating signal comprises a signal for opening the tailgate 2. Here it can only be the case that a door lock 8 of the tailgate 2 shown in FIGS. 3 and 4 is unlocked and jumps slightly due to the pressure of a seal. On the other hand, it is feasible that at the same time a motor-driven opening aid is activated by the operating signal so that the tailgate 2 opens completely.

FIG. 1 shows various auxiliary means 31, 45 of the assembly module 20 which help the user 10 to identify the user's intention in the activation region 22. Thus, the activation region 22 which is formed by the assembly module 20 is variable in its position 28, 29. For example, if the first position 28 is poorly accessible to a user, the position of the activation region 22 can be placed onto a second position 29. The positions 28, 29 are in this case deposited fixedly in a monitoring unit 60 of the optical sensor system 30 shown in FIG. 5. The positions 28, 29 are made visible for the user 10 by a display element 48. For this purpose the display element 48 has a plurality of lighting elements 43, 45. The first lighting element 43 makes the first position 28 of the activation region 22 visible whereby the first lighting element 43 emits visible light 46 (not shown). The second lighting element 45 accordingly makes the second position 29 of the activation region 22 visible whereby the second lighting element 45 emits visible light 46 (not shown). In this case the lighting element 43, 45 makes the end surface 24 of the activation region 22 visible on the ground surface 15.

If the activation region 22 is monitored in the first position 28, only the first lighting element 43 emits visible light 46. If the activation region is monitored in the second position 28, only the second lighting element 45 emits visible light 46. The user 10 can vary the position 22, 28 of the activation region 22 by means of a predefined user action. For this purpose, the user 10 can for example make an input in a user menu or execute a predefined user action, e.g. a specific gesture in the perception range 23 of the optical sensor system 30. Likewise the maximum activation duration can be adjusted by a predefined user action.

Furthermore, the user 10 can by means of a predefined user action achieve the result that the activation region 22 is monitored again in the first position 28 or in the second position 29 if, for example, the user 10 has only reached the activation region 22 after the activation duration.

As further auxiliary means, the assembly module has lighting elements 31. The lighting elements 31, e.g. LEDs are directed towards the ground surface 15 in such a manner that a marking 32 composed of a plurality of light points can be produced on the ground surface 15 when the lighting elements 31 are switched on. The lighting elements 31 are switched on during the activation duration. The marking 32 is configured so that the user 10 is guided to the activation region 22 in the first position 28.

As a further auxiliary means, a method can be deposited in the monitoring unit 60 of the optical sensor system 30 shown in FIG. 5 which also guides the user 10 to the activation region 22 in the first or second position 28, 29. For this purpose, the optical sensor system 30 determines the position of the user 10 in the perception range 23, in particular by a time-of-flight measurement and can thus determine the direction to the activation region 22 in the first or second position 28, 29 which is just being monitored. The optical sensor system 30, in particular the monitoring unit 60, causes lights 33 of a rear lamp 9 of the motor vehicle 1 to light up accordingly. If the user 10 must move to the left, for example, the adjacently disposed lights 33 can also flash from right to left. Alternatively the entire left rear lamp 9 can flash when the user 10 must orient himself towards the left. Accordingly, the entire right rear lamp 9 can flash when the user 10 must orient himself towards the right.

As further auxiliary means, a method can be deposited in the monitoring unit 60 by means of which the lighting element 43, 45 which emits light 46 begins to flash in a predefined time interval before the end of the activation duration. By this means the user 10 is warned that the activation duration will end shortly.

In FIG. 1 the perception range 23 corresponds to the detection region 21. The optical sensor system 30 permanently monitors the detection region 21 when the motor vehicle 1 is stopped. If a user 10 who is shown in FIG. 1 still outside the detection region 21, approaches the motor vehicle 1 with an ID transmitter 13 and the optical sensor system 30, the user 10 enters into the detection region 21. If the user 10 is identified in the detection region 21, a signal for starting an authentication check is triggered.

Since the optical sensor system 30 identifies that a user 10 is approaching the motor vehicle 1, and in the case of identifying the user 10 in the detection region 21, a signal is triggered for starting an authentication check, the user need not become active to initiate the authentication check. Thus, the user 10 need not hold the ID transmitter 13 in a hand 12 but it is sufficient to carry the ID transmitter 13, for example, in a pocket. This therefore involves a passive keyless entry check. The detection region 21 is directed obliquely onto the ground surface 15 in FIG. 1.

By means of the signal an access control system 14 of the authentication system 16 is caused to send a wake-up signal to the ID transmitter 13. The ID transmitter 13 then transmits an authentication code to the access control system 14. The access control system 14 compares the authentication code with a stored code. If both codes agree, the authentication is successful and an unlocking signal is triggered. This can be an unlocking signal for all the doors of the motor vehicle 1 or however only one unlocking signal for the tailgate 2. Likewise a signal is transmitted to the monitoring unit 60 to begin the monitoring of the activation region 22.

The detection region 21 has the length L. In FIG. 1 the activation region has smaller spatial dimensions than the detection region 21 and lies with both positions 28, 29 inside the detection region 21. The activation region 22 ends with both positions 28, 29 closer to the motor vehicle 1 than the detection region 21. Thus, the user 10 can maintain his direction of movement where the user 10 is initially authenticated. The user 10 can then move the foot 11 into the activation region 22.

FIG. 2 shows another exemplary embodiment as to how the assembly module 20 according to the invention is used. Insofar as this is not explained in the following, the operating mode and function of the assembly module 20 shown in FIG. 2 correspond to the operating mode and function of the assembly module 20 shown in FIG. 1. The assembly module 20 in FIG. 2 is disposed in a B pillar 4 of a motor vehicle side. An approach to a side door 3 of the motor vehicle 1 is monitored by the detection region 21. The operating signal can be used for opening the side door 3. The predefined movement for providing the operating signal can be a predefined movement with a hand 12 of the user 10 in the region of door handle 5.

In contrast to the exemplary embodiment in FIG. 1, in the exemplary embodiment shown in FIG. 2 the detection region 21 lying outside the motor vehicle 1 is located completely above the ground surface 15. The activation region 22 of the exemplary embodiment of FIG. 2 comprises the region of the door handle 5. The activation region 22 which can only adopt one position lies outside the detection region 21. The perception range comprises the detection region 21 and the activation region 22. The display element 48 not shown illuminates the door handle 5.

FIGS. 3 and 4 show another exemplary embodiment of an assembly module 20 according to the invention. Insofar as this is not explained in the following, the operating mode and function of the assembly module 20 shown in FIGS. 3 and 4 correspond to the operating mode and function of the assembly module 20 shown in FIG. 1. The assembly module 20 does not monitor any detection region 21. Thus, the perception range 23 corresponds to the activation region 22. The activation region 22 has only one possible position. The single lighting element 43 of the display element 48 which is only shown in FIG. 3 is disposed closed to the optical sensor system 30. As a result, it is possible that the light 46 emitted by the lighting element 43 is as congruent as possible with the activation region 22. In particular, the end surface 24 of the activation region 22 is identical to the section of the ground surface 15 which is illuminated by light 46. As shown in FIG. 4, the activation region 22 comprises a frustro-conical region with a round or elliptical base surface. The frustro-conical region corresponds to an oblique truncated cone.

Further auxiliary means are provided in the exemplary embodiments of FIGS. 3 and 4. Thus, the motor vehicle 1 has a capacitive sensor 17. If the maximum activation duration elapses without the user 10 having sufficiently made known his user's intention, the activation region 22 is no longer monitored. If the activation region is to be monitored again, the user 10 can, for example, move his arm in the vicinity of the capacitive sensor 17. The capacitive sensor 17 thereupon transmits a signal to the monitoring unit 60 which causes the activation region 22 to be monitored again. Here the lighting element 43 again emits visible light 46.

The motor vehicle 1 furthermore has a brightness sensor 18. The brightness sensor 18 determines the brightness of the ambient light and then transmits a signal to the monitoring unit 60 which adapts the brightness of the visible light 46. Since the emitted light 46 is sufficiently bright, the user 10 can better locate the activation region 22.

FIG. 4 shows that not only a foot 11 in the activation region 22 can be sufficient to make known the user's intention. On the contrary, a minimum distance condition must also be maintained. If a foot 11 of a user 10 is located in the activation region 22, the distance a of the foot 11 to an optical sensor 50 of the optical sensor system 30 is detected. For this purpose a light module 40 of the optical sensor system 30 emits pulsed infrared light. The light of the light module 40 is reflected at the foot 11 and is received by an optical sensor 50 of the optical sensor system 30. FIG. 1 shows a light beam 47 which is reflected from a point of the foot 11 or the end surface 24 and received by a pixel 54 of the optical sensor 50. The optical sensor 50 is evaluated by the monitoring unit 60 of the optical sensor system 30. In order to determine the distance a, a time-of-flight measurement can be made. The optical sensor 50, the light module 40 and the monitoring unit 60 are shown in FIG. 5.

The monitoring unit 60 compares the detected distance a with a minimum distance condition. The monitoring unit 60 only provides a operating signal for opening the tailgate 2 if the minimum distance condition is satisfied. In an alternative, the distance b of the end surface 24 from the optical sensor 50 can initially be detected as long as no foot 11 is located in the activation region 22. A ratio of the distance a to the distance b or a difference of the distance a from the distance b is formed and the value obtained is compared with a value stored in the monitoring unit. The minimum distance condition is only satisfied when the value exceeds the stored value relating to the ratio or falls below that relating to the difference. A specification for the provision of the operating signal has thus been made so that not every object in the activation region 22 triggers the operating signal. On the contrary, a user's intention must be there which keeps the foot 11 in the activation region 22 so that the minimum distance conditions is satisfied as the specification and the operating signal is provided.

FIG. 4 shows schematically a wheelchair 19. If a wheelchair user travels into the activation region 22, the minimum distance condition cannot initially be satisfied. As an auxiliary means, the optical sensor system 30 can be brought into a learning mode in which the optical sensor system 30 learns a changed minimum distance condition. For this purpose the wheelchair 19 can adopt a typical position in the activation region 22 which the optical sensor system 30 determines and takes as minimum distance condition. Alternatively or additionally in the learning mode the maximum activation duration can be adapted to the speed of a physically imp-aired user 10. Here the optical sensor system 30 measures the time required by the user 10 from the successful authentication until reaching the activation region 22 and from this determines an adapted maximum activation duration.

FIG. 5 shows the exemplary embodiment of an assembly module 20 according to the invention in a plan view. The assembly module 20 has an installation plate 25 as a fastening element, the optical sensor system 30 and the display element 48. The optical sensor system 30 has the light module 40 which is configured in FIG. 5 as a single light source 41. The light source 41 emits infrared light, thus forming a transmitting region 27. Shape and design of the transmitting region 27 is achieved by a lens system 42 of the light source 41 which is only shown schematically. The optical sensor system 30 additionally comprises the optical sensor 50 which can receive light from a receiving region 26. Shape and design of the receiving region 26 is predefined by a schematically depicted lens system 51 of the optical sensor 50. The perception range 23 shown by the thick line is obtained by superposing the transmitting region 27 with the detection region 26. The optical sensor 50 has an infrared filter 52 in order to filter light of other wavelengths. Furthermore, the optical sensor has an image sensor 53 on which the image is formed. The monitoring unit 60 is used to evaluate the optical sensor 50. The optical sensor 50, the light module 40 and the monitoring unit 60 are fastened on the installation plate 25. The lens systems 42, 51 are rigid.

In FIG. 5 the detection region 21 corresponds to the perception range 23. The activation region 22 can adopt two positions 28, 29 which both lie inside the detection region 21. This corresponds to the exemplary embodiment of FIG. 1. Alternatively the perception range, the detection region 21 and the activation region 22 can be formed separately so that the detection and the activation region 21, 22 are arranged as in FIG. 2. The display element 48 has an lighting element 43, 45 for each position 28, 29 of the activation region 22. The lighting element 43 has a short distance f from the optical sensor 50. An optical axis 57 of the optical sensor 50 and an optical axis 44 of the light module 40 are arranged close to one another so that the transmitting region 27 corresponds as far as possible to the receiving region 26. The optical sensor systems 30 of FIGS. 2 to 4 differ from the optical sensor system 30 shown in FIG. 5 by the lack of the second position 29 of the activation region 22 and the second lighting element 45.

FIG. 6 shows a plan view of the image sensor 53 of the assembly module 20 according to the invention from FIG. 5 which has a total number of pixels 54. Since the detection region 21 is monitored with the same image sensor 53, in each case only a few pixels 54, in particular between two and ten pixels 54 are used, in order to image the positions 28, 29 of the activation region 22 on the image sensor 53. For example, in FIG. 6 respectively four pixels 54 form each position 28, 29. During the monitoring of the activation region 22 in the first position 28, only the pixels 56 assigned to the first position 28 are evaluated. The remaining pixels correspond to non-evaluated pixels 55. During the monitoring of the activation region 22 in the second position 29, only the pixels 58 assigned to the second position 29 are evaluated. The remaining pixels correspond to non-evaluated pixels 55.

FIG. 7 contains a plot of a light intensity I over the time ts. As shown in FIG. 7, after each time interval t an image 61 is recorded with the aid of the image sensor 53, wherein in each case FIG. 7 shows a time interval $t_z$ which is required for the image 61. This can be an identification image 64 or a comparative image 63. The identification image 64 is recorded with the aid of light pulses 62 of the light module 40. In this case a plurality of light pulses 62 is required to produce an identification image 64. The light pulses 62 are emitted with a predefined pulse frequency from the light module 40. The light of the light pulses 62 of an image 61 is integrated or summed by the image sensor 53 in order to produce the identification image 64. In order to perform a distance determination, the optical sensor system 30 predefines the time interval tz in which the light pulses 62 produce an identification image 64. The distance of the user 10, in particular the body part 11, 12 from the optical sensor system 30 is determined depending on the intensity of the light pulses 62 in the time interval tz. In the comparative image 63 an image 61 is recorded without light pulses 62 of the light module 40 reaching the image sensor 53. For this purpose the light module 40 emits no light.

FIG. 8 shows a first method according to the invention. Firstly in a first step 71 the optical sensor system 30 monitors the detection region 21. If a user 10 is located in the detection region 21 and the user 10 meets the predefined criteria, the user 10 is identified. In this case, in a second step 72 a signal for the authentication check is triggered. In a third step 73 the authentication check is carried out. Here as a result of the signal triggered in step 72 the access control system 14 is caused to send a wake-up signal to the ID transmitter 13. The ID transmitter 13 then transmits an authentication code to the access control system 14. The access control system 14 compares the authentication code with a stored code. If the two codes agree, the authentication is successful and an unlocking signal is triggered. This can comprise an unlocking signal for all the doors of the motor vehicle 1 or only one unlocking signal for the tailgate 2 or the side door 3.

After a successful authentication, in a fourth step 74 a signal that the user 10 was authenticated is received by the optical sensor system 30. In a fifth step 75 it is begun to monitor the activation region 22 in the signal position 28. For this purpose a time measurement is started to determine the activation duration. Also the display element 48 begins to emit visible light 46 in a first illumination state so that the end surface 24 of the activation region 22 is made visible to the user 10. The brightness of the light 46 is adjusted according to the value transmitted by the brightness sensor 18 for the brightness of the ambient light. At the same time, the light module 40 emits pulsed infrared light in order to be able to perform distance measurements. The optical sensor 50 receives the light of the light module 40 thus forming an identification image 64. In addition, comparative images 63 are recorded and evaluated. The monitoring unit 60 evaluates the images 61 obtained. In a sixth step 76 the monitoring unit determines that only one time interval stored in the monitoring unit 60 before the end of the maximum activation duration is reached. The monitoring unit 60 causes the display element 48 to flash. In a seventh step 77 the monitoring unit 60 determines that the maximum activation duration has elapsed with a user 10 holding the foot 11 in the activation region 22. The monitoring unit 60 causes the display element 48 to emit no more light and stops the monitoring of the activation region 22 for the purpose of identifying a user's intention. However, the monitoring unit 60 still checks the perception range 23 whether a predefined user action is carried out to be able to monitor the activation region 22 again. The predefined user action can, for example, be a defined movement of the user out and back into the perception range 23. In an eighth step 78 the monitoring unit 60 determines that a predefined user action is made and begins to monitor the activation region 22 again in order to identify the user's intention for providing the operating signal. In a ninth process step the monitoring unit 60 identifies the user's intention, e.g. by the monitoring unit 60 detecting a foot 11 of the user which satisfies a minimum distance condition and ends the monitoring and display of the activation region 22. In a tenth process step 80 the monitoring unit 60 provides a operating signal.

FIG. 9 contains a second exemplary embodiment for a method 90 according to the invention. After a successful authentication, in a first step 91 a signal that the user 10 has been authenticated is received by the optical sensor system 30. In a second step 72 it is begin to monitor the activation region 22 in a first position 28. During the monitoring the monitoring unit 60 determines in a third step 73 that the user 10 has not performed the gesture in the activation region 22 in the first position 28 through which the user 10 makes known his user's intention for providing a operating signal but makes another gesture which corresponds to a predefined user action for changing the position 28, 29 of the activation region 22. Hereupon in a fourth process step 94 the monitoring unit changes the position 28, 29 of the activation region and begins with the monitoring of the activation region 22 in the second position 29. At the same time the first lighting element 43 is caused to emit no light 46 and the second lighting element 45 causes light 46 to be emitted. In a fifth process step 95 the monitoring unit 60 identifies the user's intention in the activation region 22 in the second position 29 and ends the monitoring. In a sixth process step 96 the monitoring unit 60 provides a operating signal.

In a method not shown a changed maximum activation duration is initially set in an input menu. After a successful authentication, the monitoring unit 60 begins to monitor the activation region 22 for the changed maximum activation duration. If the activation region 22 identifies the user's intention in the activation region 22 during the changed maximum activation duration, the monitoring is ended. In a final process step the monitoring unit 60 provides a operating signal.

REFERENCE LIST

1 Motor vehicle
2 Tailgate (movable part)
3 Side door (movable part)
4 B-pillar
5 Door handle
8 Door lock
9 Rear light
10 User
11 Foot
12 Hand
13 ID transmitter
14 Access control system
15 Ground surface
16 Authentication system
17 Capacitive sensor
18 Brightness sensor
19 Wheel chair, wheeled walking frame
20 Assembly module
21 Detection region
22 Activation region
23 Perception region
24 End surface
25 Fastening element
26 Receiving region
27 Transmitting region of 40
28 First position of 22
29 Second position of 22
30 Optical sensor system
31 Lighting elements
32 Marking
33 Lights of 9
40 Light module
41 Light source
42 Lens system
43 First lighting element of 48
44 Optical axis of 41
45 Second lighting element of 48
46 Light of 48
47 Reflected light beam
48 Display element
50 Optical sensor
51 Lens system of 50
52 IR filter
53 Image sensor 54 Pixel
55 Non-evaluated pixel
56 Evaluated pixel for 28
57 Optical axis of 50
58 Evaluated pixel for 29
60 Monitoring unit
61 Image
62 Light pulse
63 Comparative image
64 Identification image
70 Method
71 Process step
72 Process step
73 Process step
74 Process step
75 Process step
76 Process step
77 Process step
78 Process step
79 Process step
80 Process step
90 Method
91 Process step
92 Process step
93 Process step
94 Process step
95 Process step
96 Process step
L Length of 21
a Distance of 11 from 50
b Distance of 15 from 50
f Distance of 43 from 50

The invention claimed is:

1. An assembly module for a motor vehicle comprising an optical sensor system which is suitable
   a) for monitoring an activation region outside the motor vehicle during an activation duration in order to identify a user's intention in the activation region,
   b) for providing an operating signal in the case that the user's intention has been identified,
   wherein
   an auxiliary means is provided, which helps the user to make the user's intention in the activation region known so that the operating signal is provided,
   the assembly module comprises a display element through which visible light can be emitted in order to make the activation duration visible for the user, wherein the visible light can be emitted variably by the display element,
   a removal of a body part from the activation region must take place within a predefined removal duration so that the operating signal is provided, wherein the removal duration lies within the activation duration,
   the display element is configured for a plurality of illumination states, and one illumination state serves as an information signal for the end of the activation duration, and
   the display element changes to a different illumination state at the beginning of the removal duration.

2. The assembly module according to claim 1, wherein
   at least a position or a size of the activation region or a maximum activation duration is variable in particular by a predefined user action.

3. The assembly module according to claim 1, wherein
   the assembly module is suitable for renewed monitoring of the activation region in order to identify a user's intention to trigger an operating signal when a preceding maximum activation duration has elapsed without an identification of a user's intention.

4. The assembly module according to claim 3, wherein
   the renewed monitoring can be initiated by a predefined user action.

5. The assembly module according to claim 4, wherein
   the predefined user action is at least an input into a user menu, a triggering of a capacitive sensor or a predefined user action identifiable by the optical sensor system, in particular at least a predefined gesture within a perception range of the optical sensor system or a movement into the or out from the perception range of the optical sensor system.

6. The assembly module according to claim 1, wherein
   the assembly module can be transferred into a learning mode in which the assembly module learns at least the position to be changed or the size of the activation region or the length to be changed of a maximum activation duration.

7. The assembly module according to claim 1, wherein
   various positions of the activation region are fixedly predefined in the optical sensor system, wherein in particular the sequence in which the activation region changes the position is fixedly predefined.

8. The assembly module according to claim 1, wherein
   the display element has a plurality of lighting elements wherein in each case one or a plurality of lighting elements are fixedly assigned to the different positions of the activation region.

9. The assembly module according to claim 1, wherein
   the assembly module is suitable for determining the position of the user and the direction in which the user has to move towards the activation region, and for triggering a discernible, in particular visible, audible or perceptible signal for the user in order to lead the user to the activation region.

10. The assembly module according to claim 1, wherein
    the assembly module has means by means of which the discernible, in particular visible, audible or perceptible signal can be generated for the user in order to lead the user to the activation region, wherein the assembly module in particular comprises at least lighting elements or a loudspeaker.

11. The assembly module according to claim 1, wherein
    the optical sensor system comprises a monitor configured to evaluate images which have been recorded by the optical sensor.

12. The assembly module according to claim 1, wherein
    the optical sensor system comprises the optical sensor in order to receive light from the activation region and the optical sensor system comprises a light module having at least one light source for emitting light, wherein in particular the light source is configured to emit light in the non-visible range.

13. The assembly module according to claim 1, wherein the optical sensor comprises an image sensor with pixels, wherein during the monitoring of the activation region only that part of the pixels is evaluated which images the activation region, wherein in particular different pixels are evaluated according to the position of the activation region.

14. The assembly module according to claim 1, wherein the display element is configured to make visible an end face of the activation region on the ground surface on which the motor vehicle is standing.

15. The assembly module according to claim 1, wherein the optical sensor system is suitable for obtaining before step a) a signal that the authorized user is authorized and then instigating the monitoring of the activation region.

16. The assembly module according to claim 1, wherein the optical sensor system is suitable for monitoring prior to authentication a detection region lying outside the motor vehicle and in the case of identifying the user in the detection region triggering a signal for starting an authentication check between an ID transmitter and an access control system of the motor vehicle.

17. The assembly module according to claim 1, wherein at least the optical sensor or the light module are configured to be used both for monitoring the detection region and also for monitoring the activation region, wherein in particular the detection region and the activation region lie in the perception range of the optical sensor system.

18. The assembly module according to claim 1, wherein the activation region lies inside the detection region, wherein in particular each position which can be adopted for the activation region lies inside the detection region.

19. The assembly module according to claim 1, wherein the intensity of the light emitted by the display element is dependent on the brightness of the ambient light, wherein in particular the brightness of the ambient light can be determined by a brightness sensor.

20. An authentication system comprising an access control system, an ID transmitter and the assembly module according to claim 1.

21. A motor vehicle comprising:
the assembly module according to claim 1; or
an authentication system comprising the assembly module according to claim 1.

22. The assembly module according to claim 1, wherein the optical sensor system is configured to identify the user's intention by a predefined movement of a body part of the user into or out from the activation region.

23. A motor vehicle having an assembly module which comprises an optical sensor system which is suitable for
a) monitoring an activation region lying outside the motor vehicle during an activation duration in order to identify a user's intention in the activation region,
b) in the case of identifying the user's intention, providing an operating signal,
wherein
the motor vehicle has an auxiliary means which helps the user to make the user's intention in the activation region known so that the operating signal is provided,
the assembly module comprises a display element through which visible light can be emitted in order to make the activation duration visible for the user, wherein the visible light can be emitted variably by the display element,
a removal of a body part from the activation region must take place within a predefined removal duration so that the operating signal is provided, wherein the removal duration lies within the activation duration,
the display element is configured for a plurality of illumination states, and one illumination state serves as an information signal for the end of the activation duration, and
the display element changes to a different illumination state at the beginning of the removal duration.

24. The motor vehicle according to claim 23, wherein the motor vehicle has means by means of which a discernible, in particular visible, audible or perceptible signal can be produced for the user, in order to lead the user to the activation region, wherein in particular the motor vehicle provides adjacently disposed lights, in particular lights of a tail lamp, lights of a brake lamp, lights of indicators or a loudspeaker for the signal.

25. A method for providing an operating signal for a motor vehicle comprising the following steps:
a) monitoring an activation region lying outside the motor vehicle during an activation duration in order to identify a user's intention in the activation region,
b) in the case of identifying the user's intention, providing an operating signal,
wherein
a means is provided which helps the user to make the user's intention in the activation region known so that the operating signal is triggered,
the motor vehicle comprises an assembly module comprising a display element through which visible light can be emitted in order to make the activation duration visible for the user, wherein the visible light can be emitted variably by the display element,
a removal of a body part from the activation region must take place within a predefined removal duration so that the operating signal is provided, wherein the removal duration lies within the activation duration,
the display element is configured for a plurality of illumination states, and one illumination state serves as an information signal for the end of the activation duration, and
the display element changes to a different illumination state at the beginning of the removal duration.

26. The method according to claim 25, wherein
it is executed using the assembly module, using an authentication system comprising the assembly module or using the motor vehicle comprising the assembly module, wherein the assembly module comprises an optical sensor system which is suitable
a) for monitoring an activation region outside the motor vehicle during an activation duration in order to identify a user's intention in the activation region, b) for providing an operating signal in the case that a user's intention has been identified, wherein an auxiliary means in provided, which helps the user to make the user's intention in the activation region known so that the operating signal is provided.

27. An assembly module for a motor vehicle comprising an optical sensor system which is suitable a) for monitoring an activation region outside the motor vehicle during an activation duration in order to identify a user's intention in the activation region, b) for providing an operating signal in the case that the user's intention has been identified, wherein an auxiliary means is provided, which helps the user to make the user's intention in the activation region known so that the operating signal is provided, the assembly module comprises a display element through which visible light can be emitted in order to make the activation duration visible for the user, wherein the visible light can be emitted variably by the display element, in order to make the activation duration visible for the user, the display element is switched on at the beginning of the activation duration, and when the activation duration ends, the display element is switched off, and the length of the maximum activation duration can be varied by a predefined user action, wherein the assembly module varies the maximum length of the activation duration after the assembly module has identified the predefined user action, wherein the light emission of the display element is adapted to a changed maximum activation duration.

28. The assembly module according to claim 27, wherein the display element is configured for a plurality of illumination states, wherein in particular one illumination state serves as an indication signal of the end of the activation duration.

* * * * *